Oct. 7, 1941.                A. M. WOLF                 2,257,773
STABILIZING MEANS FOR MOTOR VEHICLES
Original Filed April 15, 1933
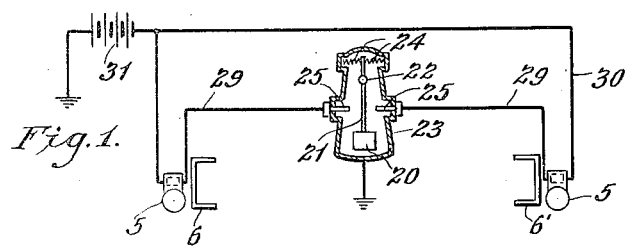
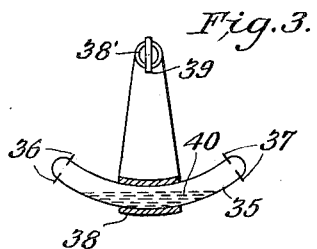
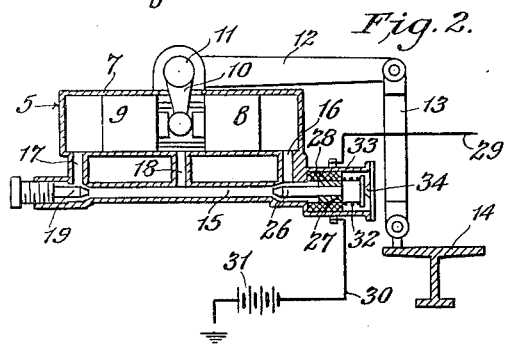
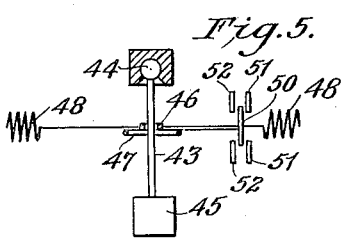
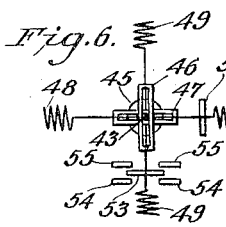
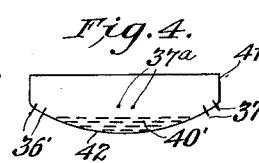
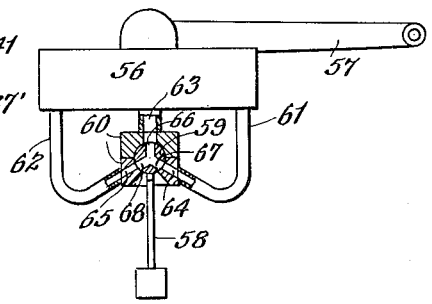
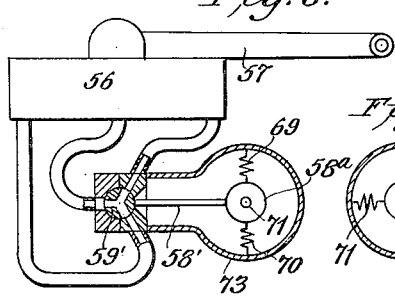
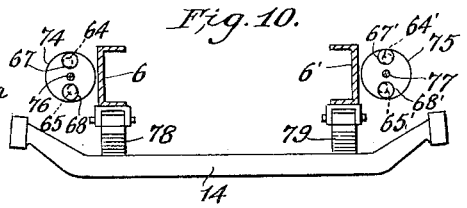
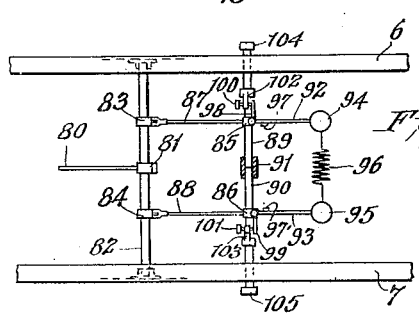
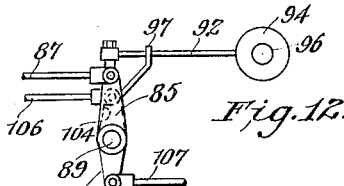
INVENTOR.
Austin M. Wolf,
BY M. C. Lyddane
ATTORNEY.

Patented Oct. 7, 1941

2,257,773

UNITED STATES PATENT OFFICE 2,257,773

STABILIZING MEANS FOR MOTOR VEHICLES

Austin M. Wolf, Plainfield, N. J.

Original application April 15, 1933, Serial No. 666,332. Divided and this application November 27, 1939, Serial No. 306,297

12 Claims. (Cl. 267—11)

This invention relates to stabilizing means for motor vehicles, the subject matter of the present application constituting a division of my pending application for patent Ser. No. 666,332, filed April 15, 1933.

Generically considered, it is the object of my invention to provide inertia controlled means operative in response to forces impressed upon the vehicle body to control the reaction of the suspension system and restrain relative movement between the body and frame or chassis of the vehicle.

Another object is to provide, in combination with a shock absorber constituting part of the vehicle suspension system, an inertia device variably controlling resistance of said shock absorber and responsive to transverse rocking motion of the vehicle body to yieldingly restrain such motion, and quickly restore a normal condition of stable equilibrium.

A further object of the invention in one embodiment thereof, is to provide a shock absorber and inertia responsive control means therefor in the form of a single compact unit.

An additional object resides in the provision of an inertia device which will be responsive to force impulses on the vehicle body both longitudinally and transversely thereof.

With the above and other objects in view, the invention consists in the improved stabilizing means for motor vehicles and in the form construction and relative arrangement of its several parts as will hereinafter be more fully described, illustrated in the accompanying drawing and subsequently incorporated in the subjoined claims.

In the drawing, which is largely diagrammatic, and in which corresponding reference characters designate similar parts throughout the several views:

Fig. 1 is a transverse section of the vehicle frame showing the shock absorbers on opposite sides thereof, in combination with one embodiment of the inertia responsive resistance control device.

Fig. 2 is a sectional view of a hydraulic shock absorber with electrically actuated resistance control means.

Fig. 3 is a modification showing an inertia responsive mercury switch for energizing the shock absorber control means.

Fig. 4 illustrates another type of mercury switch.

Figs. 5 and 6 show another inertia operated form of switch which is responsive to forces acting in two planes.

Fig. 7 illustrates another alternative embodiment of the invention, in which the shock absorber and inertia responsive resistance control device therefor are directly combined in a single unit.

Figs. 8, 9 and 10 show an alternative of said unitary construction in which the control means is actuated by inertia forces acting in two planes.

Figs. 11 and 12 show another form of "built in" shock absorber control for automatically increasing resistance of the shock absorbers on one side of the vehicle in response to centrifugal force.

Referring in detail to the drawing and for the present more particularly to Figs. 1 and 2 thereof, in one application of the invention, I have shown shock absorbers, generally indicated at 5, constituting parts of the vehicle body suspension system, suitably mounted on the opposite side rails 6, 6' of the vehicle frame or chassis. These shock absorbers may be of the type shown in my pending application and illustrated in Fig. 2 of the drawing, in which a fluid is used as the shock absorbing medium, preferably oil or other liquid.

As shown, each of the shock absorbers includes a casing 7 in which complementary piston members 8 and 9 respectively are interconnected with a lever arm 10 on one end of a rock shaft 11. An arm 12 is rigidly connected at one of its ends to the other end of the shaft 11, the other end of said arm being connected by link 13 with the vehicle axle 14. It will be understood that the pistons 8 and 9 may be provided with the customary relief valves (not shown).

The shock absorber casing 7 is provided with a longitudinal passageway 15, communicating at its opposite ends, as at 16 and 17 respectively, with the spaces between the respective pistons 8 and 9 and the ends of the cylinder or casing 7. The passageway 15 is also centrally connected, as at 18, with the space between the pistons 8 and 9. The cylinder 7, as well as the passage 15 and its connections with said cylinder is completely filled with the shock absorber fluid or liquid.

In a shock absorber of the above type, each piston 8 and 9 in its reciprocatory movement performs a single function. Upon an upward thrust of the arm 12, due to compression of the body supporting springs, the piston unit is moved to the right from its illustrated position and forces the fluid under pressure through the passages 16, 15 and 17, thus controlling the compression action of the spring. Any movement in the piston unit resulting from rebound of the spring, in which the arm 12 moves downwardly and the piston unit is reciprocated to the left, the fluid in the left end of cylinder 7 is transferred through passageways 17, 15 and 18 to the space between the pistons 8 and 9. Piston 9 therefore controls the rebound action. The permissible rate of flow of the shock absorber fluid is controlled by the adjustable valve member 19, which restricts the flow of fluid between cylinder 7 and passageway 15, through the connecting passage 17.

In order to counteract and control excessive spring compression on either side of the vehicle body with a proportionate spring distention at the opposite side thereof caused by side sway of the vehicle body or transverse forces impressed thereon by centrifugal force, as in making sharp turns, I propose to modify the responsive action of the shock absorbers, and thereby stiffen up and increase the resistance of the suspension system, and limit its responsiveness to such forces, tending to disturb the normal stable equilibrium of the vehicle body.

To the above end, in Fig. 1 of the drawing I have shown an inertia device, similar to that disclosed in my pending application, in which the weight mass 20 is fixed to the lower end of a pendulum rod 21 pivotally mounted near its upper end as at 22 in the casing or housing 23. Movement of the mass 20 in either direction from the normal perpendicular position of the rod 22 is yieldingly resisted by the springs 24 engaged with each side of the pendulum rod above the pivot 22. If desired, suitable means, such as shown in my prior application may be provided for variably regulating the resistance of these springs.

At opposite sides of the pendulum rod 21, electrical contact members 25 are suitably mounted in opposite side walls of the case 23.

Each of the shock absorbers is provided with an electrically operated valve means for variably restricting the flow of shock absorber fluid between cylinder 7 and passageway 15 through the connecting passage 16. As herein shown, this resistance regulating means for the shock absorber includes a needle valve 26 having a solenoid core 27 at one end. This needle valve is set so as to provide a normal restriction of fluid flow at the compression end of the cylinder 7. The solenoid coil 28 is connected by wires 29 and 30 respectively with one of the contacts 25 of the inertia responsive device and with the battery 31, respectively. Movement of the needle valve 26 towards its closed position is resisted by the spring 32 which acts to urge the end of the solenoid core 27 into contact with a stop 34 on the outer end wall of the casing or housing 33. This stop determines the normal position of the valve 26, and may, if desired, be in the form of an adjustable set screw.

It will be evident from the above description that a transverse force, from either side of the vehicle, such as results from side sway or tortional vibration of the chassis frame, will result in operation of the inertia device and cause a contact between the pendulum rod 21 and one of the contact members 25 so that the electrically controlled means for valves 26 of the shock absorbers at that side of the vehicle from which the force impulse is applied to rock the vehicle about its longitudinal axis will be energized so as to increase the resistance to the flow of the shock absorber fluid through passage 16, thereby proportionately increasing resistance to relative movement between the vehicle frame or body and the supporting axis.

In Fig. 3 of the drawing, I show a simple type of mercury switch which may be substituted for the inertia device of Fig. 1. This switch includes a curved insulating tube 35 having opposed circuit closing contacts 36 and 37 respectively suitably mounted in its opposite ends. This tube is centrally mounted in the lower end of a bracket member 37 pivoted at its upper end as at 38 and adjustably fixed in a required position by means of a suitable nut 39 which rigidly locks said bracket member against movement relative to the vehicle body.

The body of mercury, indicated at 40, normally occupies a central position in the tube 35 as shown. It will be evident that the inertia force will cause the mercury to flow to one end of the tube, closing the circuit through the spaced contacts, and thereby energizing the resistance control valves for the shock absorbers at one side of the vehicle frame, in the manner above explained.

In Figs. 4 to 10 inclusive of the drawing I have illustrated various alternative devices for actuating the resistance control means of the shock absorber, which are responsive to either longitudinal or transverse inertia forces. Thus, in Fig. 4, I show a suitable chamber or receptacle 41 for the body of mercury 40', having a semi-spherical base wall 42. At opposite lateral edges of this base wall the spaced contacts 36' and 37' respectively are suitably fixed therein and insulated from each other. Similar spaced contacts are also mounted in the front and rear vertical walls of said receptacle, as indicated at 37a. Thus it will be understood that inertia forces acting either transversely or longitudinally of the vehicle will result in the shifting movement of the body of mercury to close the circuit through the appropriate contacts and energize the resistance control valves for the shock absorbers which thereby modifies the rigidity of the vehicle suspension system and materially decreases the amplitude of movement of the vehicle body, in response to such inertia forces.

In Figs. 5 and 6 the pendulum rod 43 is provided with a ball and socket mounting 44 at its upper end and the weight mass 45 at its lower end. This rod extends through elongated yoke members 46 and 47 disposed in superposed relation and at right angles to each other. These yoke members are normally yieldingly held in a centralized position relative to the pendulum rod by the springs 48 and 49 which are suitably connected to the respective yoke members. The connection between one of the springs 48 and yoke member 46 is provided with a circuit closing disk 50 to engage the corresponding spaced contacts 51 and 52 respectively in its movement in opposite directions. Similarly the connection between one of the springs 49 and yoke member 47 carries a circuit closing disk 53 to engage the corresponding spaced contacts 54 and 55 respectively.

It will be apparent from the above that when the pendulum rod 43 swings in a plane perpendicular to the page or up and down in Fig. 6, the yoke member 46 does not move while when the pendulum swings from right to left, yoke member 47 remains stationary. However, during the latter movement, the yoke 46 is moved from right to left and disk 50 engaged with the contacts 52. Of course, if the movement is towards the right, said disk will then be engaged with the contacts

51. When the pendulum 45 responds to a longitudinal inertia force, yoke member 47 is moved by the pendulum rod to engage the disk 53 with either pair of contacts 54 or 55. Thus the proper circuits will be closed depending upon the direction of the inertia force and the resistance regulating valves of the shock absorbers actuated to effect a proper snubbing of the undesirable effects of such forces upon the yieldingly suspended vehicle body.

In Fig. 7 of the drawing I have shown an embodiment of the invention, in which the inertia responsive means and the resistance regulating valve are combined with the shock absorber in a simple and compact unitary structure. In this case, the shock absorber 56 is provided with the operating arm 57 as above described, the right hand end of the cylinder being the compression side and the left hand end the rebound side. The inertia responsive pendulum 58 is provided at its upper end with a cylindrical head 59, which is mounted immediately below the shock absorbing cylinder between complementary bearing members 60 which support the same for free oscillating motion. The ducts or passages 61, 62 and 63, correspond to the passages 16, 17 and 18 of Fig. 2. Ducts 61 and 62 are connected with the obliquely inclined bores 64 and 65 respectively in the lower bearing member 60. The cylindrical valve member 59 has a vertical passage 66 connected with the central passage 63 of the shock absorber cylinder. This passage 66 communicates with the inner ends of the diagonal passages 67 and 68 respectively in said valve member. It will be noted that the latter bores or passages are of greater diameter than the bores 64 and 65 in the bearing member 60.

It will be understood that the above described resistance control for the shock absorber can be arranged to operatively respond to either transverse or longitudinal inertia forces. Assuming that in response to such force, the pendulum 58 swings to the left, the valve member 59 is thereby oscillated so that the outer end of the bore 67 therein will be moved relative to the bore 64 in the stationary bearing and thus partially cut off the flow of the shock absorber fluid from duct 61 through said valve member to the passage 63. Similarly when the pendulum swings to the right, the bore 68 in the valve member is moved out of full registration with the bore 65 of the bearing to increase the resistance of the shock absorber. In the movement of the valve member to cut off the flow through the bore 64, no change is made in the effective area of the bore 65, owing to the larger diameter of the valve bore 68.

In Figs. 8, 9 and 10, another form of unified control of the shock absorbers which is responsive to inertia forces resulting from brake application as well as side sway and centrifugal forces in a transverse plane, is illustrated. In this case, the inertia operated valve member and the actuating pendulum and supporting means therefor are turned through an angle of 90 degrees from the position relative to the shock absorber cylinder as illustrated in Fig. 7. The same arrangement of the fluid circulating bores in the valve member and its supporting bearing and connecting passages with the shock absorber is also provided, the only difference being that in Fig. 8, the valve member 59' instead of being cylindrical is in the form of a sphere. The pendulum rod 58' therefore extends horizontally or laterally from the valve member. To the inertia responsive weight mass 58a of said pendulum, the vertically disposed springs 69 and 70 are attached at diametrical sides thereof. Additional horizontal springs 71 and 72, spaced 90 degrees from the springs 69 and 70 are also attached to the mass 58a. The outer ends of the springs may be fixed to any convenient support, but for this purpose, I have shown a suitable housing 73, enclosing the pendulum and secured to the valve bearing 60.

It will be seen from the above that longitudinal inertia forces resulting from positive or negative acceleration of vehicle movement will cause a vertical swinging movement of the pendulum against the resistance of one or the other of the spring 69 or 70 to actuate the valve member 59' in the manner above described and thus increase the resistance of the shock absorber to vertical movements of the vehicle body.

As the valve member 59' is in the form of a sphere, pendulum mass 58a may also swing in a horizontal plane, or both vertically and horizontally in response to concurrently acting transverse and longitudinal inertia forces. By properly locating the control ports in the valve member with respect to the ports in the bearing 60, the required restriction of flow of the shock absorber fluid through said valve member may be obtained in response to forces resultant from a side sway or when the vehicle makes a sharp turn or rounds a corner.

Upon reference to Fig. 10, diagrammatically representing the front end of the vehicle frame, the ball valves 74 and 75 to which the pendulum shanks or rods 76 and 77 respectively are attached, are shown alone adjacent to the side rail 6 and 7 of the vehicle, this figure representing a sectional view at the left of the pendulum weight 58a in Fig. 8. The valve 74 is provided with ports 67 and 68 as above explained which register with the ports 64 and 65, shown in dotted lines. Of course, the ports 67 and 68 in the ball will move in correspondence with the direction of movement of the pendulum. It will be noted, as previously explained in connection with Fig. 7 that ports 67 and 68 will cut off ports 64 and 65, depending upon whether the movement of the pendulum is up or down. By locating ports 64 and 65 in staggered relation to the ports 67 and 68, a similar cutting off of the ports 64 and 65 occurs upon horizontal movement of the pendulum. It will be seen that port 64 is located so as to be normally tangent to port 67 and at an angle of approximately 45 degrees toward the bottom of port 67 and to the right. Port 65 is also located at an angle of 45 degrees, upwardly to the left and tangent to port 68. Assuming that a suddenly applied force causes the vehicle frame and body to move to the left, the inertia rest of the pendulum will cause it to remain stationary, or the movement can be considered as the frame remaining stationary while the pendulum swings and with it the ports 67 and 68, to the right. A similar movement occurs of the other shock absorber control valve. The ports 67' and 68' of the valve ball 75, corresponds to the ports 67 and 68 in the ball 74 while the ports 64' and 65' correspond to the ports 64 and 65 but are horizontally staggered in the opposite direction with respect to the latter ports of valve ball 74. In other words port 64' is tangent to 67' at a 45 degree angle downward and to the left while port 65' is staggered upwardly at a 45 degree angle to the right and tangent to port 88'. Under a force impulse causing the two pendulums to move to the right, it will be apparent that a cutting off effect results at the ports 65 and 64'. Thus the shock absorber attached to frame rail 6 offers additional resistance at the rebound side, while the shock absorber on frame rail 6' offers additional resistance at the compression side. This is the desired result since a force to the left on the frame and body will tend to compress spring 78 and distend spring 79. When the force acts on the body and frame in a righthand direction to compress spring 79 and distend spring 78, ports 64 and 65' are cut off which produces the proper shock absorber resistance.

It is desirable that the spring suspension of the vehicle body shall afford increased resistance when the vehicle is making a sharp turn or rounding a curve, in order to counteract the tendency of centrifugal force to compress the outside springs beyond the limit of safety, and at which point the vehicle is in imminent danger of turning over. This must be done by means of a shock absorber control, sensitive to centrifugal force and which acts upon the shock absorbers on that side of the vehicle corresponding to the direction of such force.

In Figs. 11 and 12 of the drawing I have shown a built-in automatic shock absorber control of the above character. As illustrated, a manually operable ride-control rod 80 is connected with lever 81 centrally fixed to the cross shaft 82 mounted in the vehicle frame. Levers 83 and 84 on this shaft are connected with similar levers 85 and 86 respectively by the rods 87 and 88. The latter levers are suitably mounted at their lower ends upon transversely aligned shafts 89 and 90 respectively suitably mounted at their outer ends on the side rails of the vehicle frame and supported at their inner ends in a central bearing 91. Each of the levers 85 and 86 has rotatably connected with the upper end thereof one end of a horizontally extending rod 92 and 93 respectively and to the other ends of these rods, the weights 94 and 95 are suitably secured. These weights are connected by the spring 96 which yieldingly holds them in the normal position shown with the rods 92 and 93 engaged with the stops 97 and 97' on the levers 85 and 86 respectively.

Each of the rods 92 and 93 is provided at its connection with the levers 85 and 86 respectively with an arm 98 and 99. These arms in the normal position of the weights 94 and 95 have contact with adjustable screws 100, 101 in the upper ends of arms 102, 103 fixed at their lower ends to the shafts 89 and 90 respectively.

Each of the cross shafts 89 and 90 is provided at its outer end with arms 104 and 105 extending vertically above and below said shaft and connected by rods 106, 107 with the resistance regulating valves of the shock absorbers on one side of the vehicle at opposite ends thereof.

In the operation of this embodiment of the invention, assuming that the front end of the vehicle in Fig. 11 is at the left and a right hand turn is being made, centrifugal force acting on weight 94 will tend to move it downwardly (in the drawing) but such movement will be prevented by stop 96. If a left hand turn of the vehicle is being made, centrifugal force would cause the weight 94 to move upward against the tension of spring 96, thereby moving the arm 98 in a counterclockwise direction, and through the lever 102 actuating the cross shaft 89. Thus the latter shaft is rocked or rotated by the centrifugal force acting on weight 94. This motion of said shaft will be transmitted through rods 106 and 107 to the rotary resistance regulating valves on the front and rear shock absorbers which are of standard type, such for instance as shown in U. S. Patent to Seaholm, 2,023,034 December 3, 1935. It will therefore be apparent that when centrifugal force throws the weight 94 in the direction of side rail 6, it operates to produce further resistance in the shock absorbers on the compression side thereof, and therefore to increase resistance to the compression of the body sustaining springs at the right side of the vehicle. No action occurs, however, on the other side of the vehicle due to the inactivity of the weight 94, movement of which is prevented by stop 97. The arm 99, lever 103 and set screw 101 and the levers on the outer end of shaft 90 function in the manner above described in connection with the corresponding elements associated with the shaft 89.

From the foregoing description considered in connection with the accompanying drawing, the construction, manner of operation and several advantages of the described embodiments of the invention will be clearly understood. It will be appreciated that the several mechanical and electrical control means for the shock absorber resistance regulating valves which I have selected for purposes of illustration are largely illustrative and that the essential features of my present improvements might also be incorporated in still further alternative embodiments thereof. However, I believe these described constructions to be positive and efficient in their functional operation, while it is evident that in view of their simplicity, manufacturing and installation costs thereof will be comparatively low.

Accordingly, it is to be understood that in the further development of the present invention, I reserve the privilege of resorting to all such legitimate changes in the form, construction and relative arrangement of the several cooperating parts of the device as may fairly be considered to be within the spirit and scope of the appended claims.

I claim:

1. In combination with a vehicle shock absorber having resistance control means, an inertia responsive member movable longitudinally and transversely of the vehicle body, and means for operatively connecting said member with the resistance control means to actuate the latter and increase the resistance of the shock absorber to transverse or longitudinal displacement of the vehicle body.

2. In combination with a fluid shock absorber for vehicles having a fluid control valve, and means for actuating said valve to increase shock absorber resistance to transverse or longitudinal movement of the vehicle body relative to the supporting wheels, said means including an inertia responsive member having universal swinging movement.

3. In combination with a fluid shock absorber for vehicles having a resistance control valve, electrical means for actuating said valve, and inertia responsive means movable in response to forces tending to displace the vehicle body transversely or longitudinally with respect to the supporting wheels to close the energizing circuit for said electrical valve actuating means.

4. A unitary combination comprising a vehicle shock absorber, a movable resistance regulating member therefor, and an inertia responsive device connected with said member and operable in response to inertia forces from any one of a plurality of angularly related directions imposed thereon to actuate said member and modify the resistance of the shock absorber.

5. A unitary combination comprising a hydraulic shock absorber and a spherical resistance control valve therefor, and an inertia responsive device connected with said valve to actuate the same and modify the resistance of the shock absorber.

6. In combination with a vehicle shock absorber having resistance control means, actuating means for said control means including a member movably responsive to inertia forces imposed upon the vehicle body from any one of a plurality of angularly related directions.

7. A hydraulic shock absorber for vehicles, and means associated with said shock absorber for controlling flow of the hydraulic liquid, including a member movably responsive to inertia forces imposed upon the vehicle body from any one of a plurality of angularly related directions.

8. In combination with a vehicle shock absorber having resistance control means, means operatively connected with said control means and responsive to transverse or longitudinal forces imposed on the vehicle body to actuate said control means and modify the reaction of the shock absorber in proportion to the severity of such forces.

9. In combination with a vehicle shock absorber, resistance regulating means therefor, electrical control means for said regulating means, and means responsive to inertia forces imposed upon the vehicle body from any one of a plurality of angularly related directions to energize said electrical control means.

10. In combination with a vehicle shock absorber having resistance control means, electrical operating means for said control means, and means responsive to transverse or longitudinal forces imposed on the vehicle body to energize said electrical means whereby the resistance control means is actuated and the reaction of the shock absorber modified in proportion to the severity of such forces.

11. In combination with a vehicle shock absorber having a fluid flow resistance regulating valve operative, in displacement of the vehicle body in either of two opposite directions from normal position, to control the reaction of the shock absorber, actuating means for said valve comprising a single inertia device for variably controlling actuation of said valve in proportionate ratio to the amplitude of displacement of the vehicle body, to thereby correspondingly modify the resistance to flow of the shock absorber fluid.

12. An inertia control for vehicle shock absorbers, comprising, in combination with a fluid flow resistance regulating valve, an inertia mass movable in either one of two opposite directions from a normal position of equilibrium in response to relative displacement between the vehcle body and wheels, and means operative in the movement of said mass in each direction to actuate said valve in proportionate ratio to the amplitude of such displacement, and effect a correspondingly graduated reaction of the shock absorber in proportion to the severity of the inertia force.

AUSTIN M. WOLF.